July 3, 1934.  C. E. BARGE  1,965,212
WIND DIRECTION CONTROLLED SWITCH
Filed Jan. 30, 1931
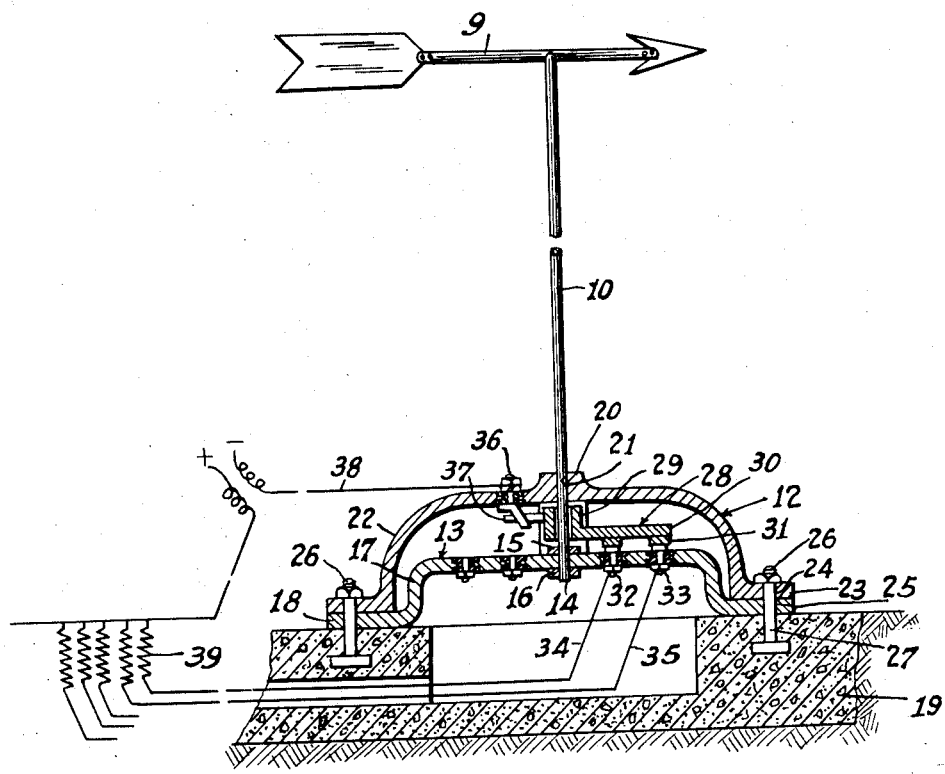
Witnesses:
Theodore Rosemann
Inventor
Cecil E. Barge
By
E. Guyer Murphy
Attorney

UNITED STATES PATENT OFFICE 1,965,212

WIND DIRECTION CONTROLLED SWITCH

Cecil E. Barge, Philadelphia, Pa.

Application January 30, 1931, Serial No. 512,313

3 Claims. (Cl. 200—81)

This invention relates to a method and means for indicating the direction of wind at landing fields and more particularly for indicating the direction of the wind by means located directly on, adjacent to or beneath the landing terrain in a manner best calculated to be observed by an aviator.

The main object of the invention is to provide novel means to indicate the direction of the wind which may be incorporated directly in the landing field for attracting the attention of and guiding the pilot of an airplane, dirigible, etc., so that safe landing may be made at night or day.

Additional objects and advantages of the invention residing in the novel method, construction, arrangement and adaptation of parts will appear more fully in the details hereinafter set forth when taken in connection with the accompanying drawing in which, The drawing is a vertical sectional view of the device, certain parts being shown in elevation.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of the instrumentalities as herein shown and described.

In the drawing, 9 designates a weather vane which may be secured in any suitable manner to a vertically-positioned rod or shaft 10 swivelly supported at the bottom by a pair of coacting members which include a bearing bracket 12 and a shell 13. The lower end 14 of the shaft 10 has secured thereto a pair of thrust collars or nuts 15, 16 engaged against the top and bottom surfaces respectively of the shell 13 which has an arcuate depending portion 17 provided with a laterally projecting peripheral flange 18 resting on a foundation 19. As best shown in this figure, the bracket 12 has a reinforced centrally positioned bearing head 20 having a hole 21 therethrough which receives the shaft 10. From the bearing head 20 radially extending legs 22 stretch, the feet 23 of which have holes 24 registering with corresponding holes 25 formed in the flange 18. Anchorage bolts 26 embedded in the foundation material 19 and having stems 27 passed through the registering holes 24, 25, serve to retain the shaft-supporting 12 and shell 13 securely to the foundation 19.

Fastened to the lower portion of the shaft 10 at a point between the bearing head 20 and the upper nut 15 is a contact making member 28 comprising a hollow head 29 in which is secured shaft 10, and an integrally formed laterally extending arm 30 having brushes or studs 31 which engage contacts 32, 33 insulatively secured in spaced relation in the shell 13 and having lead wires 34, 35, attached thereto.

In one of the radially extending legs 22 an insulated metal contact member 36 is electrically connected to an insulated carbon or metal brush 37 which may be of the spring impelled type and which is adapted to engage the periphery of the hollow head 29 as the latter revolves with the shaft 10. Current passing through a wire 38 secured to contact member 36 will thence flow through brush 37, hollow head 29, arm 30 studs 31 to insulated contacts 32, 33, then through attached wires 34, 35, to the load which may for example be any light indicating means or luminescent tubes 39.

It will, of course, be understood that as the weather vane 9 swings with the wind, the shaft 10 in turning therewith will move the arm 30 and consequently the studs or brushes 31 over the contacts 32, 33, thereby completing an electric circuit through the load 39.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent is:—

1. In a device of the kind described, a weather vane secured to a shaft rotatably mounted in a ground secured bearing bracket while revolvably sustained on a shell by elements secured thereto, a contact-making member secured on the shaft between the bracket and shell, said contact-making member including a head and a laterally extending arm having studs thereon, said bearing bracket being detachably secured to said shell, and a plurality of contacts fastened on the shell, said contacts being adapted to engaged by said studs as said shaft and arm turn with said weather vane.

2. In a device of the kind described, a weather vane secured to a shaft rotatably mounted in a ground secured bearing bracket while revolvably sustained on a shell secured on and adjacent to said bearing bracket, said bearing bracket being detachably secured to said shell, an arm fastened to said shaft, a plurality of studs secured on said arm, and a plurality of contacts secured to the shell, said contacts being engageable by said studs as said shaft and arm turn with said weather vane.

3. In means for indicating the direction of wind at aviation fields, the combination of a weather vane, a shaft revolvably mounted at one end in a bearing bracket directly fastened to a ground, said bearing bracket being detachably arranged on said shell a weather vane secured to an upper end of the shaft, a contact-making member secured to the first-mentioned end of the shaft, a shell secured to said ground and bearing bracket, and a plurality of contact elements secured to said shell and engaged by said contact-making members when said weather vane and shaft turns.

CECIL E. BARGE.